(12) United States Patent
Hoshikawa et al.

(10) Patent No.: US 7,884,145 B2
(45) Date of Patent: Feb. 8, 2011

(54) PROCESS FOR PRODUCING FILLER-CONTAINING POLYTETRAFLUOROETHYLENE GRANULES

(75) Inventors: Jun Hoshikawa, Ichihara (JP); Masumi Nomura, Ichihara (JP); Noriharu Tate, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 661 days.

(21) Appl. No.: 11/851,752

(22) Filed: Sep. 7, 2007

(65) Prior Publication Data
US 2008/0009577 A1    Jan. 10, 2008

Related U.S. Application Data

(63) Continuation of application No. PCT/JP2006/304126, filed on Mar. 3, 2006.

(30) Foreign Application Priority Data

Mar. 7, 2005    (JP) .............................. 2005-062140

(51) Int. Cl.
    *C08K 3/24*    (2006.01)
(52) U.S. Cl. .................. 523/200; 524/500; 524/544; 524/545; 524/904
(58) Field of Classification Search .............. 523/200; 524/500, 544, 545, 904
    See application file for complete search history.

(56) References Cited

U.S. PATENT DOCUMENTS

| | | | |
|---|---|---|---|
| 3,980,612 A | | 9/1976 | Gangal |
| 4,368,296 A | * | 1/1983 | Kuhls et al. .................. 525/276 |
| 4,440,879 A | * | 4/1984 | Kawachi et al. ............. 523/200 |
| 4,647,602 A | * | 3/1987 | Wilczak et al. ............. 523/204 |
| 5,324,785 A | * | 6/1994 | Noda et al. .................. 525/276 |
| 2006/0252898 A1 | * | 11/2006 | Tsuji et al. .................. 526/250 |

FOREIGN PATENT DOCUMENTS

| | | |
|---|---|---|
| EP | 1 065 223 A1 | 1/2001 |
| EP | 1 213 321 A2 | 6/2002 |
| EP | 1 213 321 A3 | 6/2002 |
| EP | 1213321 A2 * | 6/2002 |
| JP | 2002-097330 * | 4/2002 |
| JP | 2002-97330 | 4/2002 |
| JP | 2002-155147 | 5/2002 |
| WO | WO-2006/095657 A1 * | 9/2006 |

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, L.L.P.

(57) ABSTRACT

A process for producing filler-containing polytetrafluoroethylene granules by an underwater agitation granulation method, whereby filler-containing polytetrafluoroethylene granules excellent in flowability can be obtained with little detachment of the filler and it is possible to prevent discharge of a polytetrafluoroethylene emulsion into waste liquid, the process characterized in that in a stage of granulating a mixture of polytetrafluoroethylene powder and a filler by agitation in water in the presence of a liquid organic substance hardly soluble in water, a polytetrafluoroethylene emulsion and a coagulant are added to coagulate the polytetrafluoroethylene emulsion as a surface layer of the filler-containing polytetrafluoroethylene granules.

16 Claims, No Drawings

PROCESS FOR PRODUCING FILLER-CONTAINING POLYTETRAFLUOROETHYLENE GRANULES

TECHNICAL FIELD

The present invention relates to a process for producing filler-containing polytetrafluoroethylene granules excellent in flowability with little detachment of the filler, which are useful as a molding material for e.g. slide members or sealing members.

BACKGROUND ART

Polytetrafluoroethylene (hereinafter referred to as PTFE) has excellent chemical resistance and heat resistance and thus is widely used as material for various industrial components.

In an application to e.g. slide members or sealing members among industrial components, PTFE itself is inadequate in the abrasion resistance or compression property, and in many cases, PTFE is used as mixed with a filler.

As the filler to improve the abrasion resistance or compression property, various fillers may be employed such as a glass fiber powder, a carbon fiber powder or a bronze powder. A filler-containing PTFE powder obtainable by mixing such a filler, is compression-molded, followed by cutting work to form a bearing, a gasket or the like.

However, the filler-containing PTFE powder has no substantial flowability and thus is difficult to use. Accordingly, it is usually subjected to a granulation process to form filler-containing PTFE granules having flowability imparted.

With such filler-containing PTFE granules, a phenomenon has been observed wherein the mixed filler falls off from the surface layer of the granules due to vibration during the transportation or other causes. Such a phenomenon is called detachment of the filler. If detachment of the filler is remarkable, the uniformity of the filler-containing PTFE granules deteriorates, which may adversely affect the appearance and physical properties of a molded product obtainable from such filler-containing PTFE granules. Further, there has been a problem that the flowability of the filler-containing PTFE granules tends to deteriorate.

In order to solve such problems, a method has been proposed wherein a small amount of a PTFE emulsion is added during the production of the filler-containing PTFE granules by an underwater agitation granulation method (Patent Document 1).

However, by the proposed method, a new problem has resulted such that upon completion of the granulation step, the PTFE emulsion not attached to the surface of the filler-containing PTFE granules is discharged together with the waste liquid, whereby the waste liquid becomes turbid. Further, the PTFE emulsion discharged without being attached to the filler-containing PTFE granules, is present in the waste liquid, and the mass of the discharged PTFE emulsion is hardly measurable, whereby there has been a problem that the PTFE content in the obtainable filler-containing PTFE granules can hardly be accurately grasped.

Patent Document 1: U.S. Pat. No. 3,980,612

DISCLOSURE OF THE INVENTION

Object to be Accomplished by the Invention

It is an object of the present invention to provide a process for producing filler-containing PTFE granules by an underwater agitation granulation method, whereby filler-containing PTFE granules excellent in flowability can be obtained with little detachment of the filler, and it is possible to prevent discharge of the PTFE emulsion into a waste liquid.

Means to Accomplish the Object

Namely, the present invention provides the following:

(1) A process for producing filler-containing PTFE granules, characterized in that in a stage of granulating a mixture of PTFE powder and a filler by agitation in water in the presence of a liquid organic substance hardly soluble in water, a PTFE emulsion and a coagulant are added to coagulate the PTFE emulsion as a surface layer of the filler-containing PTFE granules.

(2) The process for producing filler-containing PTFE granules according to the above (1), wherein the PTFE powder is a suspension polymerization product, and the PTFE emulsion is an emulsion polymerization product.

(3) The process for producing filler-containing PTFE granules according to the above (1) or (2), wherein the average particle diameter of the PTFE powder is from 1 to 65 µm, and the weight average molecular weight of the PTFE is from 100,000 to 100,000,000.

(4) The process for producing filler-containing PTFE granules according to any one of the above (1) to (3), wherein the filler is a powder of an inorganic material or a powder of an organic material.

(5) The process for producing filler-containing PTFE granules according to any one of the above (1) to (4), wherein the coagulant is at least one member selected from the group consisting of nitric acid, hydrochloric acid, sulfuric acid, aluminum chloride and aluminum nitrate.

(6) The process for producing filler-containing PTFE granules according to any one of the above (1) to (5), wherein the liquid organic substance is at least one member selected from the group consisting of hexane, heptane, nonane, decane, dodecane, gasoline and kerosene.

(7) The process for producing filler-containing PTFE granules according to any one of the above (1) to (6), wherein the liquid organic substance is used in an amount of from 10 to 100 parts by mass per 100 parts by mass of the total solid content of the PTFE powder and the filler.

(8) The process for producing filler-containing PTFE granules according to any one of the above (1) to (7), wherein the mixed ratio of the PTFE powder to the filler is PTFE powder/filler=100/0.01 to 100/250 (mass ratio).

(9) The process for producing filler-containing PTFE granules according to any one of the above (1) to (8), wherein the average particle diameter of PTFE particles in the PTFE emulsion is from 0.01 to 5 µm, and the weight average molecular weight of the PTFE is from 100,000 to 100,000,000.

(10) The process for producing filler-containing PTFE granules according to the above (1), wherein after carrying out a granulation step of mixing the liquid organic substance hardly soluble in water to the mixture of the PTFE powder and the filler, followed by agitation in water for granulation, in a particle size regulating step for the particles obtained by the granulation, the PTFE emulsion and the coagulant are added.

(11) The process for producing filler-containing PTFE granules according to the above (10), wherein in the particle size regulating step, after the coagulant is added and mixed, the PTFE emulsion is added.

(12) Filler-containing PTFE granules produced by the process as defined in any one of the above (1) to (11) and having an average particle diameter of from 200 to 1,000 µm.

EFFECTS OF THE INVENTION

The filler-containing PTFE granules produced by the present invention are excellent in flowability with little detachment of the filler and thus are useful for improvement of the productivity or quality of the molded products. Further, by the process of the present invention, it is possible to prevent discharge of the PTFE emulsion into the resulting waste liquid thereby to reduce the amounts of the raw material and the formed product contained in the waste liquid.

BEST MODE FOR CARRYING OUT THE INVENTION

The PTFE powder to be used in the process for producing filler-containing PTFE granules of the present invention, is preferably PTFE particles obtainable by suspension polymerization of tetrafluoroethylene (hereinafter referred to as TFE). Such PTFE particles may be used as pulverized, as the case requires. The average particle diameter of the PTFE powder is preferably from 1 to 65 μm, particularly preferably from 3 to 50 μm.

PTFE may be a homopolymer of TFE. Otherwise, it may be a copolymer PTFE (referred to also as modified PTFE) containing polymerized units based on another monomer copolymerizable with TFE in a proportion of at most 0.5 mol %, which may not impart a melt flowability.

Specific examples of such another monomer include a fluoroorefin other than TFE, such as hexafluoropropylene, chlorotrifluoroethylene or trifluoroethylene; a fluorovinyl ether such as a perfluoro(alkyl vinyl ether), a perfluoro(alkoxyalkyl vinyl ether) or a perfluoroalkyl)methyltrifluorovinyl ether; and an olefin such as a (perfluoroalkyl)ethylene, ethylene or propylene.

The perfluoro(alkyl vinyl ether) may, for example, be perfluoro(methyl vinyl ether), perfluoro(ethyl vinyl ether), perfluoro(propyl vinyl ether), perfluoro(butyl vinyl ether) or perfluoro(pentyl vinyl ether).

The perfluoro(alkoxyalkyl vinyl ether) may, for example, be perfluoro(ethoxymethyl vinyl ether), perfluoro(propoxypropyl vinyl ether), perfluoro(ethoxyethyl vinyl ether) or perfluoro(methoxyethyl vinyl ether).

Among them, hexafluoropropylene, perfluoro(n-propyl vinyl ether) or (perfluoro-n-butyl)ethylene is particularly preferred. Such another monomer may be used alone, or two or more of them may be used in combination.

The weight average molecular weight of PTFE in the PTFE powder is not particularly limited, but it is preferably from 100,000 to 100,000,000, particularly preferably from 1,000,000 to 50,000,000.

The filler to be used in the present invention is preferably an inorganic material or an organic material which is stable at about 370° C. which is the temperature for sintering PTFE, more preferably a powder of an inorganic material or a powder of an organic material. As a specific example of the filler, preferred is at least one member selected from the group consisting of a glass powder, a pulverized powder of glass fiber, an alumina powder, a silica powder, a talc powder, a graphite powder, a coke powder, a carbon black powder, a pulverized powder of carbon fiber, a bronze powder, a polyimide powder, a molybdenum disulfide powder and a polyphenylene sulfide powder, and more preferred is at least one member selected from the group consisting of pulverized powder of glass fiber, a graphite powder, a coke powder, a carbon black powder, a pulverized powder of carbon fiber, a bronze powder, a polyimide powder, a molybdenum disulfide powder and a polyphenylene sulfide powder. Such fillers may be used alone or in combination as a mixture of two or more of them. Further, the average particle diameter of the filler is preferably from 0.1 to 100 μm.

In the present invention, the PTFE powder is mixed with the filler and used as a mixture. The amount of the filler to be incorporated, is preferably from 0.01 to 250 parts by mass, particularly preferably from 0.1 to 150 parts by mass, based on 100 parts by mass of the PTFE powder. Mixing of the PTFE powder with the filler may be carried out by various agitation devices such as a Henschel mixer. The peripheral velocity of agitation vanes is not particularly limited, but is preferably from 10 to 100 m/sec. Further, the agitation time may be suitably selected, but it is preferably from 30 seconds to 10 minutes.

The PTFE emulsion to be used in the present invention is preferably a PTFE emulsion obtained by emulsion polymerization of TFE. PTFE in the PTFE emulsion may be a homopolymer of TFE. Otherwise, it may be a copolymer PTFE containing polymerized units based on another monomer copolymerizable with TFE in a proportion of at most 0.5 mol %, which may not impart a melt flowability.

A specific example of such another monomer may be a fluoroolefin other than TFE, such as hexafluoropropylene, chlorotrifluoroethylene or trifluoroethylene; a fluorovinyl ether such as a perfluoro(alkyl vinyl ether), a perfluoro(alkoxyalkyl vinyl ether) or a perfluoroalkyl)methyltrifluorovinyl ether; or an olefin such as a (perfluoroalkyl)ethylene, ethylene or propylene.

Particularly preferred is hexafluoropropylene, perfluoro(n-propyl vinyl ether) or (perfluoro-n-butyl)ethylene.

The weight average molecular weight of PTFE in the PTFE emulsion is preferably from 100,000 to 100,000,000, particularly preferably from 1,000,000 to 50,000,000. The average particle diameter of PTFE particles in the PTFE emulsion is preferably from 0.01 to 5 μm, particularly preferably from 0.1 to 0.5 μm.

The content of PTFE particles in the PTFE emulsion is preferably from 10 to 50 mass %, more preferably from 15 to 45 mass %, further preferably from 20 to 40 mass %, particularly preferably from 20 to 30 mass %.

As the emulsifier contained in the PTFE emulsion, various emulsifiers may be mentioned which may be used for emulsion polymerization of TFE. However, a fluorinated emulsifier such as a fluoroalkyl carboxylate such as ammonium perfluorooctanoate is preferred, since the chain transferability to TFE is very little. The content of the emulsifier is not particularly limited, but it is usually preferably from 0.001 to 1 mass % per 100 parts by mass of PTFE.

The amount of the PTFE emulsion to be added is preferably from 0.1 to 20 parts by mass, particularly preferably from 1 to 10 parts by mass, as calculated as solid content, per 100 parts by mass of the total solid content of the PTFE powder and the filler.

As the coagulant in the PTFE emulsion in the present invention, any coagulant which is commonly used for coagulation of a PTFE emulsion, may be used. For example, a water-soluble salt such as magnesium chloride, aluminum chloride or aluminum nitrate; an acid such as nitric acid, hydrochloric acid or sulfuric acid; or a water-soluble organic liquid such as an alcohol or acetone, may, for example, be mentioned. The coagulant is preferably at least one member selected from the group consisting of aluminum chloride, aluminum nitrate, nitric acid, hydrochloric acid and sulfuric acid, more preferably aluminum chloride or aluminum nitrate.

The amount of the coagulant to be added, is preferably from 0.01 to 1 part by mass, particularly preferably from 0.05 to 0.5 part by mass, per 100 parts by mass of the total solid content of the PTFE powder and the filler.

In the present invention, the liquid organic substance hardly soluble in water is preferably one having a boiling point of from 30 to 150° C., more preferably from 70 to 130° C. Specific examples include, for example, a hydrocarbon such as hexane, heptane, octane, nonane, decane, dodecane, gasoline, kerosene oil or toluene; a chlorinated hydrocarbon such as carbon tetrachloride or trichloroethylene; and a fluorinated hydrocarbon such as trichlorotrifluoroethane, trichlorodifluoroethane or trichlorofluoromethane.

The amount of the liquid organic substance hardly soluble in water to be added is preferably from 10 to 100 parts by mass, more preferably from 20 to 50 parts by mass, per 100 parts by mass of the total solid content of the PTFE powder and the filler. The liquid organic substance hardly soluble in water is preferably at least one member selected from the group consisting of hexane, heptane, nonane, decane, dodecane, gasoline, kerosene oil and toluene, more preferably nonane, decane and dodecane. Such liquid organic substances may be used alone or in combination of two or more of them.

As the granulation system in the present invention, an underwater agitation granulation method is employed. The underwater agitation granulation method is a method comprising a granulation step in which the liquid organic substance hardly soluble in water is mixed as a binder to a mixture of the PTFE powder and the filler, followed by agitation in water for granulation, a particle size-regulating step of regulating the size of the granulated particles and a drying step of drying the size-regulated particles. In such a case, it is preferred that a hydrophilic filler is preliminarily treated with a silane coupling agent, a silicone oil or the like for water repellency.

Addition of the PTFE emulsion and the coagulant may be in the granulation step or in the particle size-regulating step, preferably in the particle size-regulating step. When the addition of the PTFE emulsion and the coagulant is carried out in the particle size-regulating step, it is possible to prevent deposition of PTFE on an upper portion of the inner wall of the agitation vessel. Further, the filler-containing PTFE granules may be made to have a uniform particle diameter and may be made to have an excellent flowability.

The addition of the PTFE emulsion and the coagulant in the particle size-regulating step may be carried out by adding either one of them first. It is particularly preferred that the coagulant is added and thoroughly mixed, and then the PTFE emulsion is added, whereby it is possible to prevent adhesion of the PTFE emulsion on the inner wall of the vessel above the liquid surface in the particle size-regulating step, and the flowability of the filler-containing PTFE granules will be excellent.

For the agitation in the granulation step and the particle size-regulating step, various agitation systems may be employed. As the agitation vessel, a tank having a baffle plate equipped with an agitator is usually suitable. As the agitator, a commercially available agitator having propeller vanes, flat vanes, 45° pitched flat vanes, turbine vanes or pitched or pitch-less curved vanes, a spiral agitator or a comb-like agitator may, for example, be used.

The agitation rate in the particle size-regulating step is preferably made milder than the agitation in the granulation step. Specifically, the agitation rate in the particle size-regulating step is preferably suppressed to a level of 10 to 70% of the agitation rate in the granulation step. The agitation rate in the granulation step may suitably be selected, but it is preferably from 100 to 3,000 rpm, particularly preferably from 300 to 2,000 rpm. If the agitation rate is within a range of from 100 to 3,000 rpm, the bulk density and the powder flowability will be excellent.

The agitation rate in the particle size-regulating step is preferably from 10 to 2,100 rpm, more preferably from 30 to 1,400 rpm.

The agitation time in the granulation step is preferably from 5 seconds to 4 minutes, particularly preferably from 10 seconds to 2 minutes.

The agitation time in the particle size-regulating step is preferably from 1 to 20 minutes, particularly preferably from 3 to 15 minutes.

The average particle diameter of the granulated filler-containing PTFE granules is preferably from 200 to 1,000 μm, particularly preferably from 400 to 700 μm. If the average particle diameter is within a range of 200 to 1,000 μm, the PTFE granules will be excellent in the bulk density and the powder flowability.

EXAMPLES

Now, the present invention will be described in further detail with reference to Examples (Examples 1 to 3) and Comparative Examples (Examples 4 and 5), but it should be understood that the present invention is by no means thereby restricted.

The detachment test method for the filler-containing PTFE granules was carried out in accordance with the following method.

Average Particle Diameter (Unit: μm) if Filler-Containing PTFE Granules

Standard sieves with 10, 20, 35, 40 and 60 mesh were piled in this order from the top, and the filler-containing PTFE granules were put on the sieve with 10 mesh, followed by shaking, whereupon the mass of the filler-containing PTFE granules remaining on each sieve was obtained. Based on this mass, the 50% particle diameter was obtained from the logarithmic probability paper and taken as the average particle diameter of the filler-containing PTFE granules.

Apparent Density (Unit: g/L) of Filler-Containing PTFE Granules

The apparent density was measured in accordance with JIS K6891. A sample of the filler-containing PTFE granules was dropped into a weighing bottle made of stainless steel and having an inner volume of 100 mL from a funnel set above, and the sample protuberant from the weighing bottle was scraped off with a flat plate, whereupon the weight of the sample remaining in the weighing bottle was divided by the inner volume of the weighing bottle, and the value thereby obtained was taken as the apparent density.

Tensile Strength (Unit: MPa) and Elongation (Unit: %)

Measured in accordance with JIS K6891. The test sample was prepared as follows. The filler-containing PTFE granules were subjected to preforming under a pressure of 58.9 MPa, followed by sintering at 370° C. for 4 hours and then cooling at a temperature-lowering speed of 70° C./hr to obtain a sheet having a thickness of 2 mm, from which a test sample was punched out by dumbbell No. 3.

Hardness (Unit: Durometer D)

Measured in accordance with JIS K7215.

Detachment Property of Filler-Containing PTFE Granules 10 g of the filler-containing PTFE granules were put in a transparent plastic bag and shaken 100 times, whereby the state of adhesion of the filler on the inner surface of the plastic bag was visually observed, and evaluated by A, B and C in the order of the detachment property being less.

Flowability (Unit: mm) of Filler-Containing PTFE Granules

Measured by means of a measuring apparatus shown in FIG. 1 on page 7 of JP-A-2002-97330. 100 g of a sample of the filler-containing PTFE granules was put into a hopper-shaped container, and the bottom of the container was opened at a constant rate, and the span of the opening (slit) when about 50 g of the granules dropped, was taken as the powder flowability. Such a powder flowability was measured as an initial one and one after imparting vibrations with an amplitude of 40 mm and a frequency of 7.5 Hz for 30 minutes. Particles easily breakable or the filler easily detachable by the vibrations will have a high numerical value of the flowability after the vibrations for 30 minutes.

Mass (Unit: g) of Solid Content after Drying Waste Liquid

The waste liquid discharged after the granulation step was collected, and the mass of the solid content after completely removing water by drying, was measured.

EXAMPLE 1

To 575 g of PTFE powder (average particle diameter: 25 μm, weight average molecular weight: 20,000,000), 10 g of carbon fiber-pulverized powder having an average particle diameter of 30 μm (tradename "M207S", manufactured by Kureha Corporation) and 30 g of bronze powder having an average particle diameter of 35 μm (tradename "AT-350", manufactured by Fukuda Metal Foil Powder Co., Ltd.) were added and mixed by a Henschel mixer at a peripheral velocity of agitation vanes of 40 m/sec for an agitation time of 90 seconds to obtain a PTFE composition. The obtained PTFE composition was put into a stainless steel container of 10 L provided with a baffle plate, and 3 L of water and 470 mL of n-decane as a binder were added, followed by agitation by means of propeller agitation vanes having a vane length of 100 mm at a rotational speed of 600 rpm for one minute (granulation step). Thereafter, the rotational speed was reduced to 300 rpm, and 100 g of a 25 mass % PTFE emulsion (emulsifier: ammonium perfluorooctanoate, content of the emulsifier: 0.05 mass % per 100 parts by mass of PTFE, average particle diameter of PTFE: 0.2 μm, weight average molecular weight: 20,000,000) was added and agitated for two minutes. Then, 10 g of a 10 mass % aluminum nitrate aqueous solution was added, followed by agitation for 8 minutes (particle size-regulating step). Thereafter, the filler-containing PTFE granules and a waste liquid were separated by a sieve. The waste liquid was transparent without turbidity. The PTFE granules on the sieve were dried at 300° C. for 3 hours to obtain filler-containing PTFE granules.

EXAMPLE 2

To 575 g of PTFE powder (average particle diameter: 25 μm, weight average molecular weight: 20,000,000), 10 g of carbon fiber-pulverized powder having an average particle diameter of 30 μm (tradename "M207S", manufactured by Kureha Corporation) and 30 g of bronze powder having an average particle diameter of 35 μm (tradename "AT-350", manufactured by Fukuda Metal Foil Powder Co., Ltd.) were added and mixed by a Henschel mixer at a peripheral velocity of agitation vanes of 40 m/sec for an agitation time of 90 seconds to obtain a PTFE composition. The obtained PTFE composition was put into a stainless steel container of 10 L provided with a baffle plate, and 3 L of water and 470 mL of n-decane as a binder were added, followed by agitation by means of propeller agitation vanes having a vane length of 100 mm at a rotational speed of 600 rpm for one minute (granulation step). Thereafter, the rotational speed was reduced to 300 rpm, 10 g of a 10 mass % aluminum nitrate aqueous solution was added, followed by agitation for two minutes. Then, 100 g of a 25 mass % PTFE emulsion (emulsifier: ammonium perfluorooctanoate, content of the emulsifier: 0.05 mass % per 100 parts by mass of PTFE, average particle diameter of PTFE: 0.2 μm, weight average molecular weight: 20,000,000) was added, followed by agitation for 8 minutes (particle size-regulating step). Thereafter, the filler-containing PTFE granules and a waste liquid were separated by a sieve. The waste liquid was transparent without turbidity. The PTFE granules on the sieve were dried at 300° C. for 3 hours to obtain filler-containing PTFE granules. No deposition of the PTFE emulsion was observed on the inner wall of the container above the liquid surface in the particle size-regulating step.

EXAMPLE 3

Filler-containing PTFE granules were obtained in the same manner as in Example 1 except that in Example 1, instead of the 25 mass % PTFE emulsion, 100 g of a 35 mass % PTFE emulsion was added. The waste liquid was transparent without turbidity.

EXAMPLE 4

Filler-containing PTFE granules were obtained in the same manner as in Example 1 except that in Example 1, the 10 mass % aluminum nitrate aqueous solution was not added. The waste liquid was turbid.

EXAMPLE 5

Filler-containing PTFE granules were obtained in the same manner as in Example 1 except that in Example 1, the 25 mass % PTFE emulsion and the 10 mass % aluminum nitrate aqueous solution were not added. The waste liquid was turbid.

Table 1 shows the mixed mass ratio of the starting material PTFE powder, the carbon fiber-pulverized powder, the bronze powder, the PTFE emulsion and aluminum nitrate in Examples 1 to 5, and the average particle diameter, apparent density and detachment property of the obtained filler-containing PTFE granules, the tensile strength, elongation and hardness of a molded product obtained by molding the filler-containing PTFE granules, and the state of the waste liquid.

TABLE 1

|  |  | Ex. 1 | Ex. 2 | Ex. 3 | Ex. 4 | Ex. 5 |
|---|---|---|---|---|---|---|
| Starting materials (g) | PTFE powder | 575 | 575 | 575 | 575 | 600 |
|  | Carbon fiber-pulverized powder | 10 | 10 | 10 | 10 | 10 |

TABLE 1-continued

|  |  | Ex. 1 | Ex. 2 | Ex. 3 | Ex. 4 | Ex. 5 |
|---|---|---|---|---|---|---|
|  | Bronze powder | 30 | 30 | 30 | 30 | 30 |
| Binder (mL) | n-decane | 470 | 470 | 470 | 470 | 470 |
| Additives (g) | 25 mass % PTFE emulsion | 100 | 100 | — | 100 | — |
|  | 35 mass % PTFE emulsion | — | — | 100 | — | — |
|  | 10 mass % aluminum nitrate aqueous solution | 10 | 10 | 10 | — | — |
| Characteristics of granules | Average particle diameter (μm) | 510 | 520 | 530 | 590 | 570 |
|  | Apparent density (g/L) | 0.958 | 0.960 | 0.960 | 0.968 | 0.976 |
|  | Detachment property | A | A | A | A | C |
|  | Powder flowability Initial (mm) | 11.0 | 11.0 | 11.0 | 11.0 | 8.0 |
|  | Powder flowability After vibration for 30 minutes (mm) | 7.0 | 6.0 | 7.5 | 14.0 | 16.0 |
| Characteristics of waste liquid | State of waste liquid | Transparent | Transparent | Transparent | Turbid | Turbid |
|  | Mass of solid content after drying waste liquid (g) | 0.0 | 0.0 | 0.0 | 13.2 | 0.0 |
| Characteristics of molded product | Tensile strength (MPa) | 17.3 | 17.9 | 18.0 | 17.6 | 18.4 |
|  | Elongation (%) | 357 | 340 | 350 | 320 | 317 |
|  | Hardness (durometer D) | 64 | 64 | 64 | 63 | 63 |

INDUSTRIAL APPLICABILITY

According to the process for producing filler-containing polytetrafluoroethylene granules of the present invention, it is possible to prevent discharge of the polytetrafluoroethylene emulsion into a waste liquid from the production process.

The filler-containing polytetrafluoroethylene granules produced by the process of the present invention are excellent in flowability with little detachment of the filler and thus are useful for various molding applications such as compression molding, ram extrusion and isostatic molding. Further, the obtained molded products are useful as various industrial components such as a slide member, a sealing member, a gasket member, an oil sealing member, a piston ring component and a backup ring component.

The entire disclosure of Japanese Patent Application No. 2005-62140 filed on Mar. 7, 2005 including specification, claims and summary is incorporated herein by reference in its entirety.

What is claimed is:

1. A process for producing filler-containing polytetrafluoroethylene granules, comprising (1) as a granulating stage, granulating a mixture of polytetrafluoroethylene powder and a filler by agitation in water in the presence of a liquid organic substance hardly soluble in water, and as either part of said granulating stage or subsequently in a particle size-regulating stage, (2) adding a polytetrafluoroethylene emulsion and a coagulant to coagulate the polytetrafluoroethylene emulsion as a surface layer of the filler-containing polytetrafluoroethylene granules, wherein the coagulant is at least one member selected from the group consisting of nitric acid, hydrochloric acid, sulfuric acid, aluminum chloride and aluminum nitrate.

2. The process for producing filler-containing polytetrafluoroethylene granules according to claim 1, wherein the polytetrafluoroethylene powder is a suspension polymerization product, and the polytetrafluoroethylene emulsion is an emulsion polymerization product.

3. The process for producing filler-containing polytetrafluoroethylene granules according to claim 1, wherein the average particle diameter of the polytetrafluoroethylene powder is from 1 to 65 μm, and the weight average molecular weight of the polytetrafluoroethylene is from 100,000 to 100,000,000.

4. The process for producing filler-containing polytetrafluoroethylene granules according to claim 1, wherein the filler is a powder of an inorganic material or a powder of an organic material.

5. The process for producing filler-containing polytetrafluoroethylene granules according to claim 1, wherein the liquid organic substance is at least one member selected from the group consisting of hexane, heptane, nonane, decane, dodecane, gasoline and kerosene.

6. The process for producing filler-containing polytetrafluoroethylene granules according to claim 1, wherein the liquid organic substance is used in an amount of from 10 to 100 parts by mass per 100 parts by mass of the total solid content of the polytetrafluoroethylene powder and the filler.

7. The process for producing filler-containing polytetrafluoroethylene granules according to claim 1, wherein the mixed ratio of the polytetrafluoroethylene powder to the filler is polytetrafluoroethylene powder/filler=100/0.01 to 100/250 (mass ratio).

8. The process for producing filler-containing polytetrafluoroethylene granules according to claim 1, wherein the average particle diameter of polytetrafluoroethylene particles in the polytetrafluoroethylene emulsion is from 0.01 to 5 μm, and the weight average molecular weight of the polytetrafluoroethylene is from 100,000 to 100,000,000.

9. The process for producing filler-containing polytetrafluoroethylene granules according to claim 1, wherein the polytetrafluoroethylene emulsion and the coagulant are added in the particle size-regulating stage.

10. The process for producing filler-containing polytetrafluoroethylene granules according to claim 9, wherein in the particle size regulating stage, after the coagulant is added and mixed, the polytetrafluoroethylene emulsion is added.

11. The process for producing filler-containing polytetrafluoroethylene granules according to claim 9, wherein said particle size regulating stage is carried out by agitating at a rate which is 10 to 70% of the rate in which said granulating stage is carried out.

12. The process for producing filler-containing polytetrafluoroethylene granules according to claim 1, wherein (2) is carried out as part of (1).

13. The process for producing filler-containing polytetrafluoroethylene granules according to claim 1, wherein the coagulant is aluminum chloride or aluminum nitrate.

14. The process for producing filler-containing polytetrafluoroethylene granules according to claim 1, wherein the coagulant is aluminum nitrate.

15. The process for producing filler-containing polytetrafluoroethylene granules according to claim 1, wherein the PTFE emulsion contains an emulsifier, and the content of the emulsifier is from 0.001 to 1 mass % per 100 parts by mass of PTFE in the PTFE emulsion.

16. The process for producing filler-containing polytetrafluoroethylene granules according to claim 1, wherein said filler-containing polytetrafluoroethylene granules have an average particle diameter of from 200 to 1,000 μm.

* * * * *